US008726177B2

(12) United States Patent
Zeringue et al.

(10) Patent No.: US 8,726,177 B2
(45) Date of Patent: May 13, 2014

(54) SYSTEMS AND METHODS FOR GENERATING A DATABASE QUERY USING A GRAPHICAL USER INTERFACE

(75) Inventors: Donna Evelyn Zeringue, Cary, NC (US); Russell Edward Robison, Cary, NC (US); Nancy Anne Rausch, Apex, NC (US)

(73) Assignee: SAS Institute Inc., Cary, NC (US)

( * ) Notice: Subject to any disclaimer, the term of this patent is extended or adjusted under 35 U.S.C. 154(b) by 1584 days.

(21) Appl. No.: 12/115,815

(22) Filed: May 6, 2008

(65) Prior Publication Data

US 2009/0024940 A1    Jan. 22, 2009

Related U.S. Application Data

(60) Provisional application No. 60/950,417, filed on Jul. 18, 2007.

(51) Int. Cl.
*G06F 3/048* (2013.01)
*G06F 7/00* (2006.01)
*G06F 9/44* (2006.01)
*G06F 17/30* (2006.01)

(52) U.S. Cl.
USPC ............................. 715/763; 707/999; 715/835

(58) Field of Classification Search
USPC .......................................... 715/835; 707/999
See application file for complete search history.

(56) References Cited

U.S. PATENT DOCUMENTS

| | | | |
|---|---|---|---|
| 5,548,754 A * | 8/1996 | Pirahesh et al. | 1/1 |
| 5,918,225 A * | 6/1999 | White et al. | 1/1 |
| 6,434,545 B1 | 8/2002 | MacLeod et al. | |
| 6,553,371 B2 | 4/2003 | Gutierrez-Rivas et al. | |
| 6,564,204 B1 | 5/2003 | Amundsen et al. | |
| 6,640,221 B1 | 10/2003 | Levine et al. | |
| 6,744,449 B2 | 6/2004 | MacLeod et al. | |
| 6,836,777 B2 | 12/2004 | Holle | |
| 6,980,981 B2 | 12/2005 | Beavin et al. | |
| 7,007,007 B2 | 2/2006 | Slutz | |
| 7,092,955 B2 * | 8/2006 | Mah et al. | 1/1 |

(Continued)

OTHER PUBLICATIONS

Killer Bite Software, "SQL Visualizer", http://www.sqlvisualizer.com/Features/ScreenShots/UserInterface.aspx [26 pp.].

(Continued)

*Primary Examiner* — Boris Pesin
*Assistant Examiner* — Elizabeth G Wright
(74) *Attorney, Agent, or Firm* — Kilpatrick Townsend & Stockton LLP

(57) ABSTRACT

A computer-implemented graphical user interface system for generating a database query includes a create region, a plurality of clause-specific regions and a navigation region. The create region may be used to receive a plurality of graphical icons and to create an association between the plurality of graphical icons to define the database query. The plurality of graphical icons may include a plurality of clause-specific icons that identify clauses for the database query and a plurality of table icons that identify sets of data in the database. The plurality of clause-specific interface regions are each associated with a particular clause-specific icon and may be used to receive user input to define one or more parameters associated with the particular clause-specific icon. The navigation region may be used to receive user input to select between the create region and the plurality of clause-specific interface regions.

23 Claims, 18 Drawing Sheets

(56) References Cited

U.S. PATENT DOCUMENTS

| | | |
|---|---|---|
| 7,167,852 B1 | 1/2007 | Ahmed et al. |
| 7,461,077 B1 * | 12/2008 | Greenwood ............................ 1/1 |
| 7,580,941 B2 | 8/2009 | Narasayya et al. |
| 2003/0177137 A1 | 9/2003 | MacLeod et al. |
| 2003/0197738 A1 | 10/2003 | Beit-Zuri et al. |
| 2005/0234979 A1 | 10/2005 | Martineau et al. |
| 2008/0091647 A1 | 4/2008 | Gao Zhong et al. |
| 2009/0063517 A1 | 3/2009 | Wright et al. |
| 2009/0063547 A1 | 3/2009 | Wright et al. |

OTHER PUBLICATIONS

Stolte, Chris et al., "Polaris: A System for Query, Analysis, and Visualization of Multidimensional Databases," Communications of the ACM, vol. 51, No. 11, pp. 75-84 (Nov. 2008).

* cited by examiner

| Operand | Operator |
|---|---|
| CUSTOMER.CUSTOMER_ID | = |
| ⌄ | = |

Choose column(s)...
CASE
Subquery
Advanced

Fig. 6

| Operator | Operand |
|---|---|
| = | INVOICE.CUSTOMER_ID |
| = ⌄ | |

←---
BETWEEN
NOT BETWEEN
EXISTS
NOT EXISTS
IS MISSING
NOT IS MISSING
IS NULL

SYSTEMS AND METHODS FOR GENERATING A DATABASE QUERY USING A GRAPHICAL USER INTERFACE

CROSS-REFERENCE TO RELATED APPLICATIONS

This application claims priority from and is related to U.S. Provisional Patent Application No. 60/950,417, filed on Jul. 18, 2007 and titled "Determining SQL Join Relationships." This application is related to U.S. patent application Ser. No. 12/115,808, titled "Systems and Methods for Automatically Creating an SQL Join Expression," which also claims priority from U.S. Provisional Patent Application No. 60/950,417. These related applications are incorporated herein by reference in their entirety.

FIELD

The technology described in this patent document relates generally to databases and database operations. More particularly, systems and methods are provided for generating a database query using a graphical user interface.

BACKGROUND AND SUMMARY

Various software tools are available for extracting, transforming and loading data in a database. One example is the SAS® Data Integration Studio sold by SAS Institute, Inc. of Cary, N.C.

In accordance with the teachings described herein, systems and methods are provided for generating a database query using a graphical user interface. In one embodiment, a computer-implemented graphical user interface system for generating a database query is provided that include a create region, a plurality of clause-specific regions and a navigation region. The create region may be used to receive a plurality of graphical icons and to create an association between the plurality of graphical icons to define the database query. The plurality of graphical icons may include a plurality of clause-specific icons that identify clauses for the database query and a plurality of table icons that identify sets of data in the database. The plurality of clause-specific interface regions are each associated with a particular clause-specific icon and may be used to receive user input to define one or more parameters associated with the particular clause-specific icon. The navigation region may be used to receive user input to select between the create region and the plurality of clause-specific interface regions.

In another embodiment, a computer-implemented graphical user interface system for generating a database query is provided that includes a first interface and a second interface. The first interface may be used to receive a first set of graphical icons, the first set of graphical icons including one or more clause-specific icons that identify database operations and one or more table icons that identify sets of data in the database. The first interface is further configured to create an association between the first set of graphical icons to create a database query. The second interface is displayed by performing a drill-down operation in connection with a join-related clause icon in the first set of graphical icons. The second interface may be used to receive a second set of graphical icons and to create an association between the second set of graphical icons to define a join operation in the database query.

BRIEF DESCRIPTION OF THE DRAWINGS

FIGS. 5-7 depict an example graphical user interface for defining the parameters of an SQL where operation.

DETAILED DESCRIPTION

Figure 1:
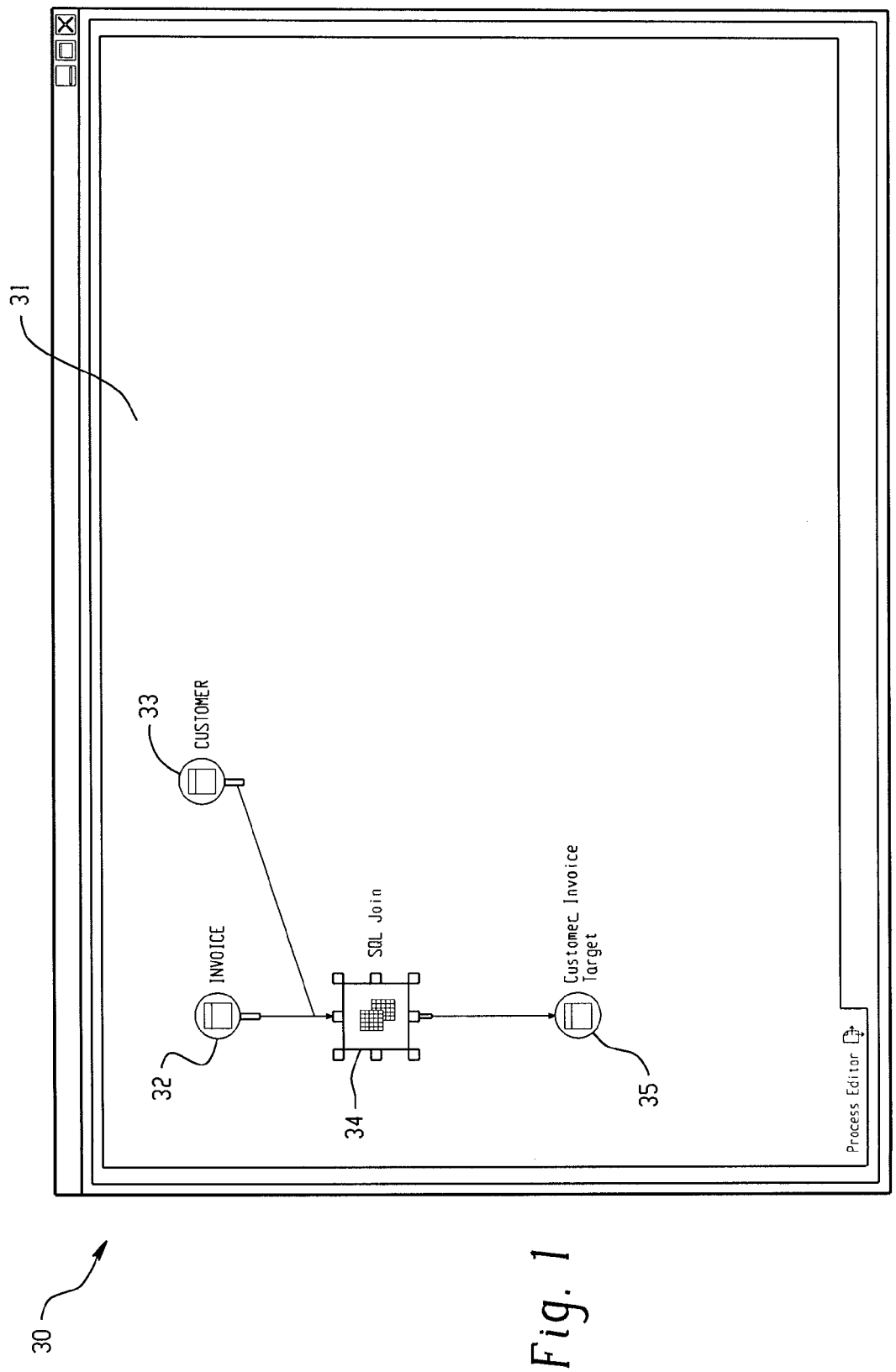
FIG. 1 depicts an example graphical user interface for defining a database query.

FIG. 1 depicts an example graphical user interface 30 for defining a database query. The graphical user interface 30 includes a process editor region 31 and is configured to receive graphical icons 32-35 in the process editor region 31 and to associate the graphical icons 32-25 to visualize and define a database query. The graphical icons 32-35 include at least one icon 34 that identifies a database operation, and one or more table icons 32, 33 that identify sets of data in the database (e.g., tables) to be included in the database query. The graphical icons 35 may also include a target table icon 35 that identifies a database location (e.g., a table) in which the results of the query are to be stored.

In the example illustrated in FIG. 1, an SQL join operation is defined that combines data from two tables 32, 33 in the database and stores the combined data in a target table 35. To create this database query, a join icon 34 is input to the process editor region 31 of the interface 30, for example by selecting the join icon 34 from a list of possible database operations and dragging the icon 34 into the process editor region 31. In addition, the table icons 32, 33 and the target table icon 35 are input to the process editor region 31 to identify the source of data for the join operation and the storage location for the join output. In one example, the table icons 32, 33 and the target table icon 35 may be input to the process editor region 31 by selecting tables from a list and dragging the tables into the process editor region 31. It should be understood, however, that the table icons 32, 33 and the target table 35 may also be identified in other ways. For instance, when the SQL join icon 34 is input to the process editor region 31, the interface 30 may automatically prompt the user to select tables 32, 33 for the join operation and to identify a target table 35 for the join output.

In order to define the properties of the database operation(s) identified in the process editor region 31, a drill-down operation may be performed in connection with a selected graphical icon. Performing a drill-down operation in connection with a particular graphical icon will cause a new interface to be displayed that is specific to the database operation associated with that graphical icon. A drill-down operation may, for example, be initiated by moving a cursor over the icon and double-clicking a mouse button, or by some other suitable user input. For instance, if a drill-down operation is performed in connection with the SQL join icon 34 depicted in FIG. 1, then a new graphical user interface will be displayed that is specific to the SQL join operation and that may be used to define the parameters of the join.

Figure 2:
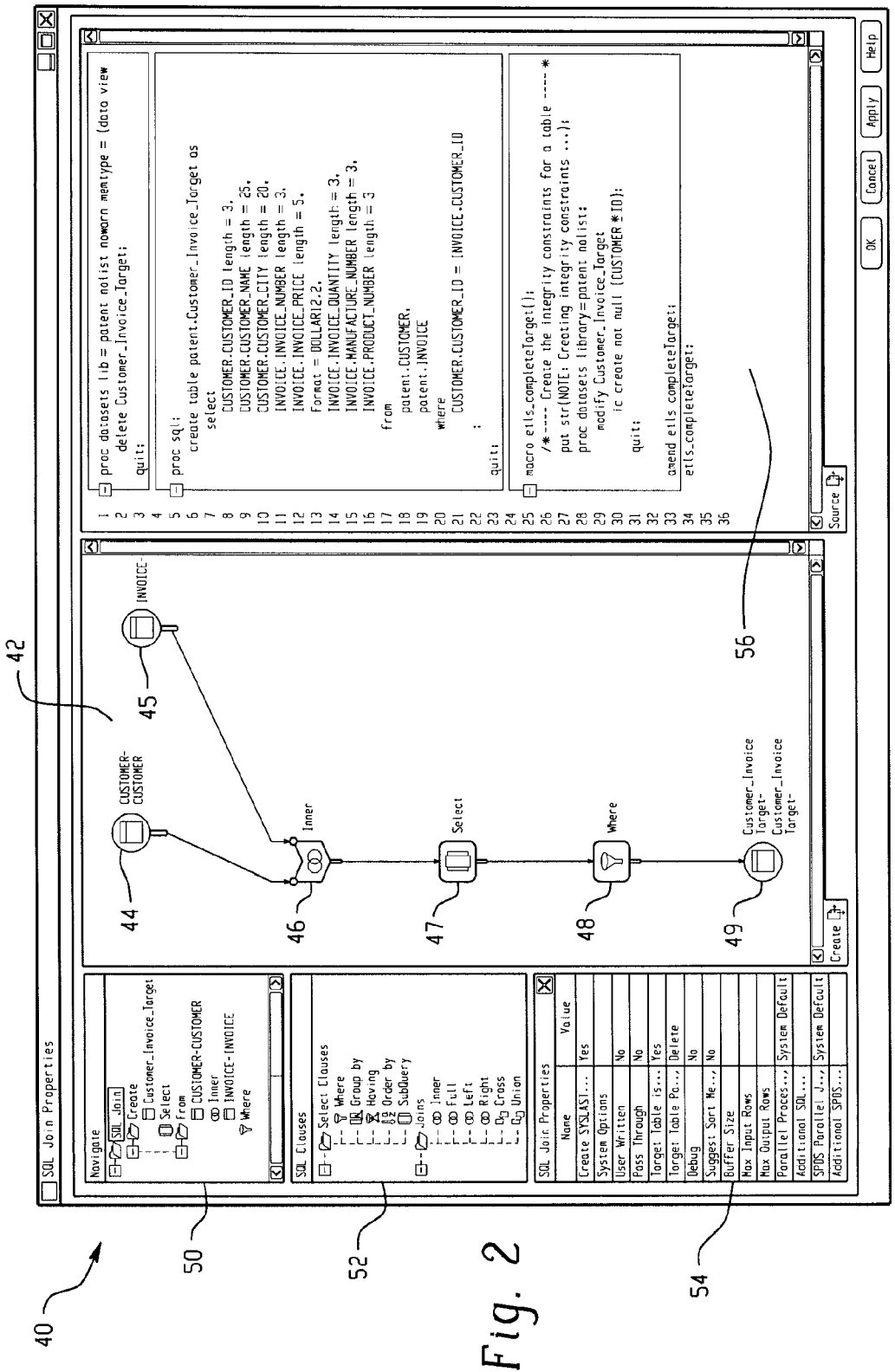
FIGS. 2 and 3 depict an example graphical user interface for defining the parameters of an SQL join operation.

FIG. 2 depicts an example graphical user interface 40 for defining the parameters of an SQL join operation. The graphical user interface 40 includes a create region 42 that is configured to receive and manipulate graphical icons 44-49 to define the SQL join operation. In addition, the graphical user interface 40 includes a navigate region 50, an SQL clause region 52, a join properties region 54 and a source code region 56 that are used along with the create region 42 to define and visualize the SQL join operation.

The create region 42 provides a process editor view of the SQL operation being built. Graphical icons 44-49 that define the SQL operation are displayed in the create region 42. These graphical icons 44-49 may be added to the create region 42 either automatically or through actions of the user. For instance, a join clause icon 46, select clause icon 47 and where clause icon 48 may be included in every join operation and therefore may be automatically added to the create region 42 by the graphical user interface 40. In other examples, however, these or other graphical icons representing SQL clauses may be manually added to the create region 42, for example by selecting the SQL clause from a list and dragging the associated graphical icon into the create region 42. Similarly, the table icons 44, 45 and the target table icon 49 may be automatically added to the create region 42 (e.g., based on the input to the process editor region 31 of FIG. 1) or may be manually added through actions of the user.

The SQL clauses region 52 displays a plurality of SQL clauses that may be added to the SQL join operation. For example, SQL clauses displayed in the SQL clauses region 52 could be added to the join operation by selecting a clause and dragging it into the create region 42. In another example, performing an operation in connection with one of the clauses in the SQL clauses region 52 may cause an SQL clause icon to be automatically added at an appropriated place in the join operation displayed in the create region 42. For example, double clicking on the "Order by" line in the SQL clauses region 52 may cause an order by operation to be automatically added to the join operation and an order by icon to be displayed at an appropriate position in the create region 42 (see, e.g., FIG. 8).

Figure 3:
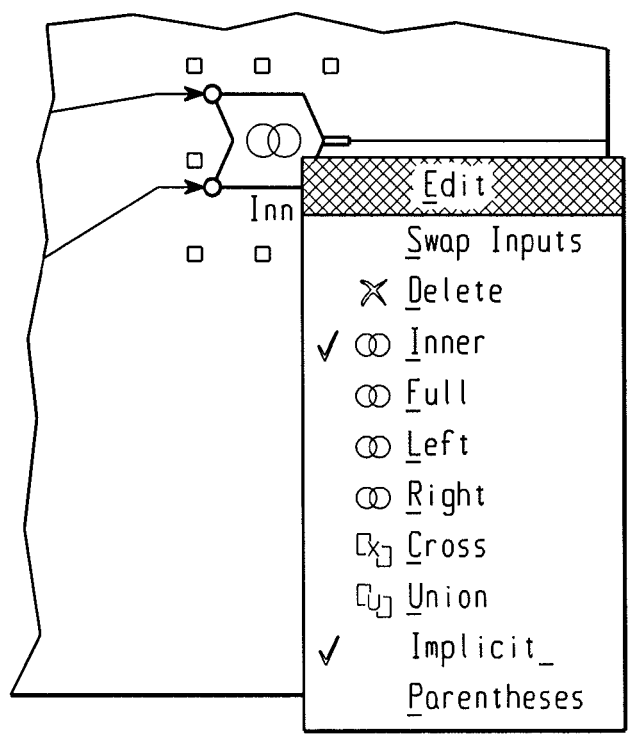

The properties of the SQL join operation may be modified by performing operations in connection with the graphical icons 46-48 displayed in the create region 42. For instance, the type of join operation (e.g., inner join, full join, left join, right join, etc.) may be selected by performing an operation in connection with the join icon 46, such as performing a right mouse button (RMB) operation to select from a list of possible join types. Example join operations that may be selected in connection with a join icon 46 are illustrated in FIG. 3. As shown in FIG. 3, a menu may be displayed in connection with the join icon that enables the user to swap the left and right join inputs, delete the join, change the join type, or perform other operations to modify the properties of the SQL join operation. For instance, other operations illustrated in the example of FIG. 3 include a menu selection to select an implicit or explicit join type and a menu selection to add parenthesis around the two tables being joined. An implicit join type means that the condition is implied in the where statement. Changing this selection to explicit would introduce an ON statement into the SQL expression.

Figure 4:
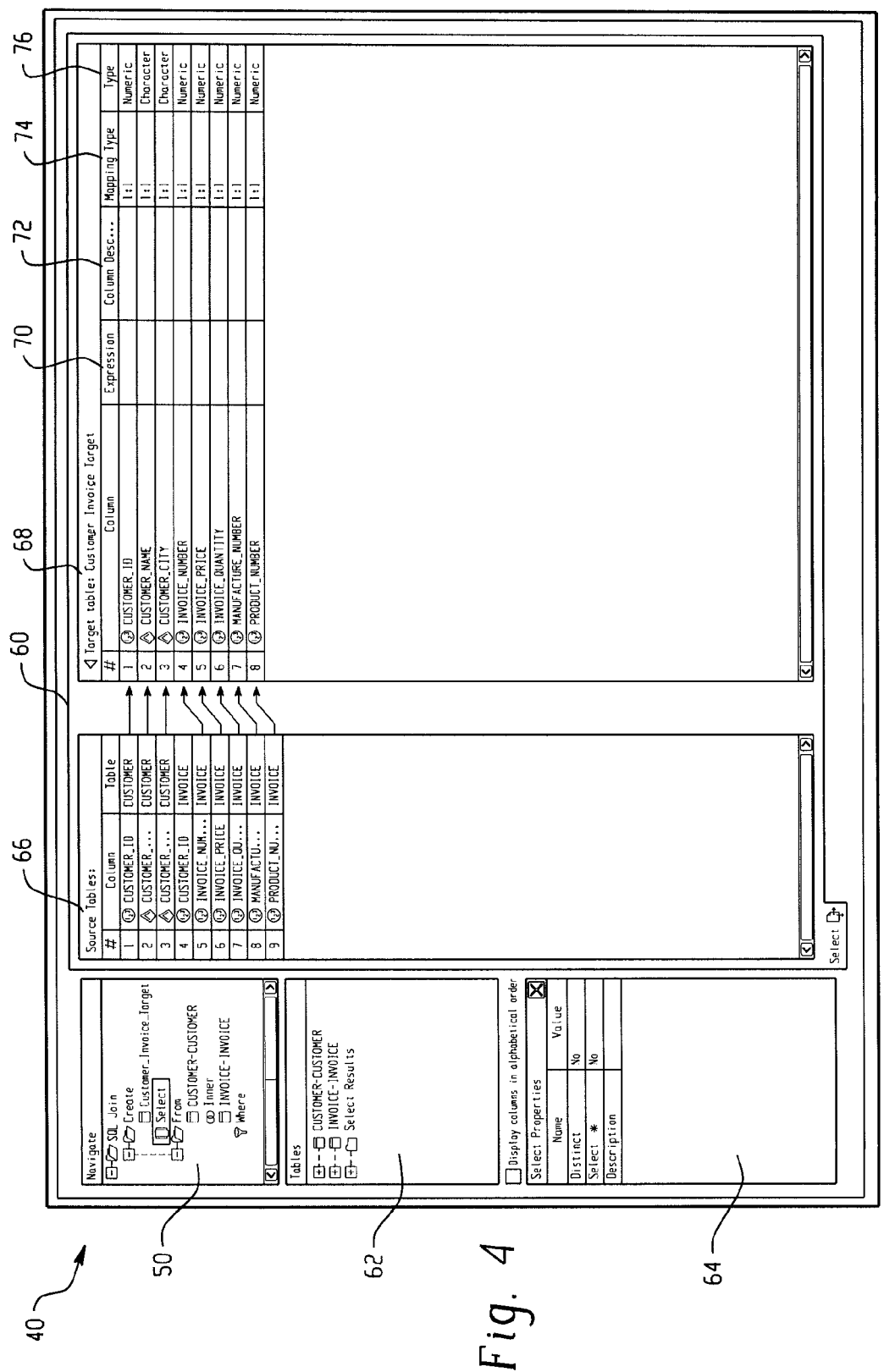
FIG. 4 depicts an example graphical user interface for defining the parameters of an SQL select operation.
Figure 5:
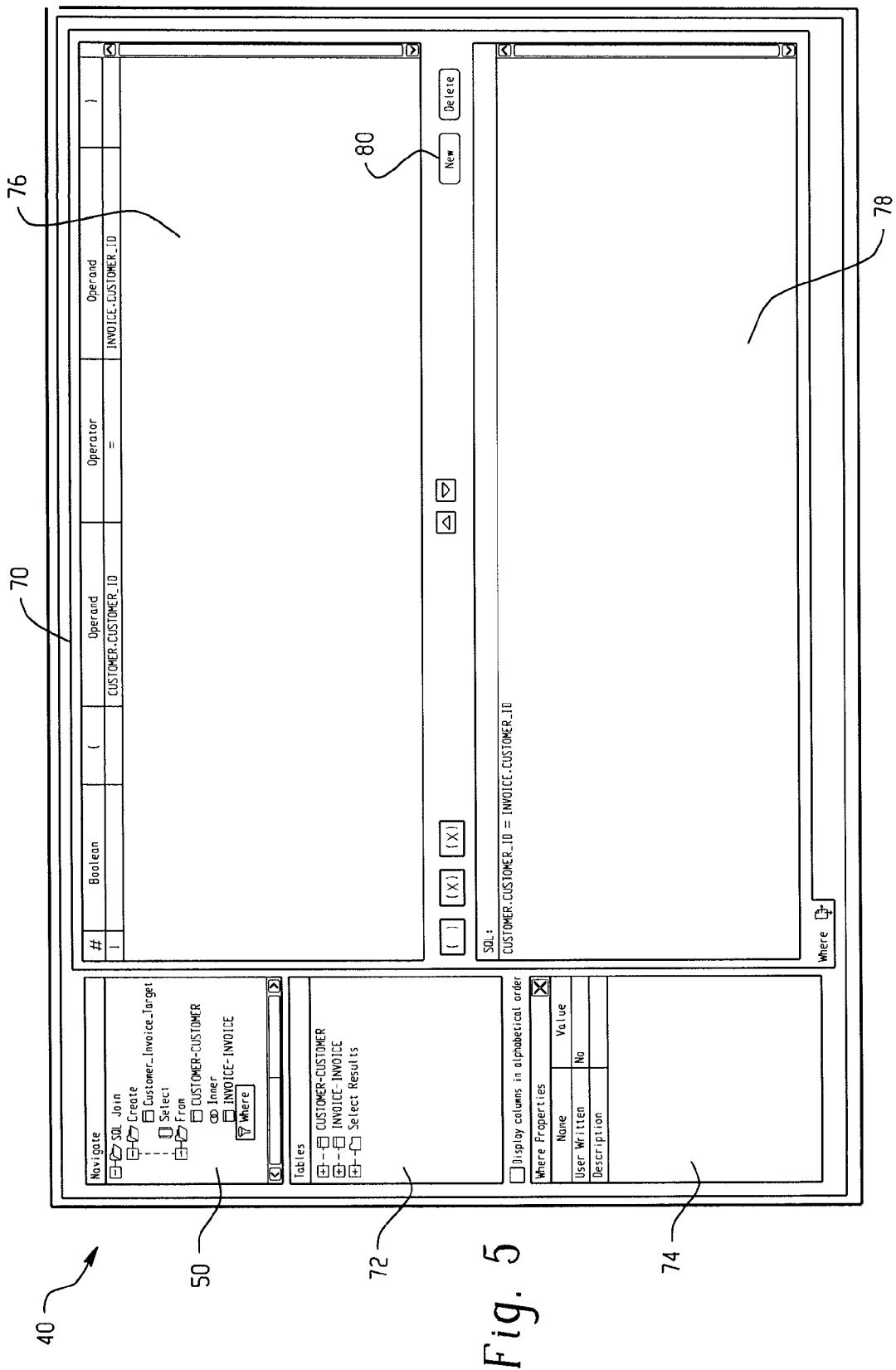

In addition, the properties of the SQL join operation may be modified using one or more other regions in the interface 40, such as the SQL join properties region 54 as well as the select clause region 60 and where clause region 70 illustrated in FIGS. 4 and 5, respectively. Also, one or more properties of the join operation may be automatically defined by the graphical user interface, for example using the auto-join operations described below with reference to FIGS. 16-18.

With reference again to FIG. 2, the navigate region 50 provides a hierarchical view of the SQL join operation that may be used for navigating the rest of the regions in the interface 40 to create and define the properties of the SQL join operation. Each SQL statement is displayed on a line in the navigate region 50. For instance, in the illustrated example, the navigate region 50 includes lines associated with both the select icon 47 and the where icon 48. Selecting a single line in the navigate region 50 will cause the interface 40 to display and/or highlight other regions in the interface 40 that are associated with the selected line. For instance, in the illustrated example the "SQL Join" line is selected in the navigate region 50. This causes the interface 40 to display the create region 42, SQL clauses region 52, and SQL join properties region 54, all of which are associated with the "SQL Join" line in the navigate region 50. In addition, the source code associated with the selected line in the navigation region 50 may also be displayed in the source code region 56.

Selecting other lines in the navigate region 50 will cause other regions to be displayed. For instance, selecting the "Select" line will cause regions associated with the select operation to be displayed, as illustrated in FIG. 4. Similarly, selecting the "Where" line will cause regions associated with the where operation to be displayed, as illustrated in FIG. 5.

With reference first to FIG. 4, this figure depicts example interface regions 60, 62, 64 that may be displayed to define the SQL select operation in the SQL join. These regions 60, 62, 64 may, for example, be displayed by selecting the "Select" line in the navigate region 50. Specifically, the example regions that are displayed in association with the select clause include a table mapping region 60, a table selection region 62 and a select properties region 64.

The table selection region 62 may be used to select tables for the source of the join operation. The select properties region 64 is displayed to enable a user to define one or more properties of the select operation. The table mapping region 60 is used to edit the columns from the source tables that are to be included in the join operation, and also to map the selected columns to their position in the target table. The table mapping region 60 includes a source tables portion 66 that lists the columns to be joined and a target table portion 68 that lists the resultant columns in the target table. Arrows between the source table portion 68 and the target table portion 68 map the columns from the source tables to the columns in the target table. Also, as illustrated in FIG. 4, the column listings in the source tables and target table portions 66, 68 may include graphics to indicate the type of data in the column (e.g., key data, index data, etc.)

In addition, the table mapping region 60 may also be used to add or edit additional data or operations associated with columns in the target table. For instance, the illustrated embodiment includes four fields 70, 72, 74, 76 within the table mapping region 60 which are respectively used for entering or editing SQL expressions (e.g., case statements, aggregations, subqueries, etc.), column descriptions, mapping type and table type.

With reference now to FIG. 5, this figure depicts example interface regions 70, 72, 74 that may be displayed to define the SQL where operation in the SQL join. These interface regions may, for example, be displayed by selecting the "Where" line in the navigate region. Specifically, the example regions that are displayed in association with the where clause include a where expression region 70, a source tables region 72 and a where properties region 74.

The where expression region 70 has a top portion 76 that includes editable fields that are used to define the where expression and a bottom portion 78 that displays the SQL code that results from the expression defined in the top portion 76. As illustrated, the editable fields in the top portion 76 of the region 70 may include fields for entering the expression operands and the expression operator. For instance, in the illustrated example the operand and operator fields have been populated to define the where expression CUSTOMER.CUSTOMER_ID=INVOICE.CUSTOMER_ID. This expression is thus displayed in the bottom portion 78 of the region 70.

Boolean operators and parentheses may also be added using fields in the upper portion 76 of the region to define more complex expressions. Also, additional statements may be added to the expression by adding additional lines in the top portion 76 of the where expression region 76, for example by selecting a graphical button 80. In this way, a user may add an additional line of editable fields for each additional statement in the where clause.

FIGS. 6 and 7 illustrate examples of how the editable fields in the top portion 76 of the where expression region 70 may be populated. As shown in FIG. 6, the operand field may include an associated pull-down menu that displays operands that may be selected by the user. For instance, the user may be able to select a column from a source table, an SQL CASE operand, a Subquery operand, or select from one or more advanced options. Similarly, FIG. 7 illustrates an example pull-down menu associated with the operator field that may be used for selecting from possible operators. It should be understood, however, that in other examples parameters may be entered into these or other fields in the where expression region 70 using other suitable methods. For instance, the user may be able to select columns for an expression operand using the source tables region 72.

With reference again to FIG. 5, the user may also be permitted to directly modify the SQL code displayed in the bottom portion 78 of the where expression region 70. As illustrated, the where properties region 74 may include a user written field that controls whether the user is permitted to directly modify the SQL code. If user written permission is enabled, then the user may directly modify the code by entering text into the bottom portion 78 of the where expression region 70. In one example, modifications made to the code in the bottom portion 78 of the where expression region 70 may also be automatically reflected in the fields displayed in the top portion 76 of the region 70.

Figure 8:
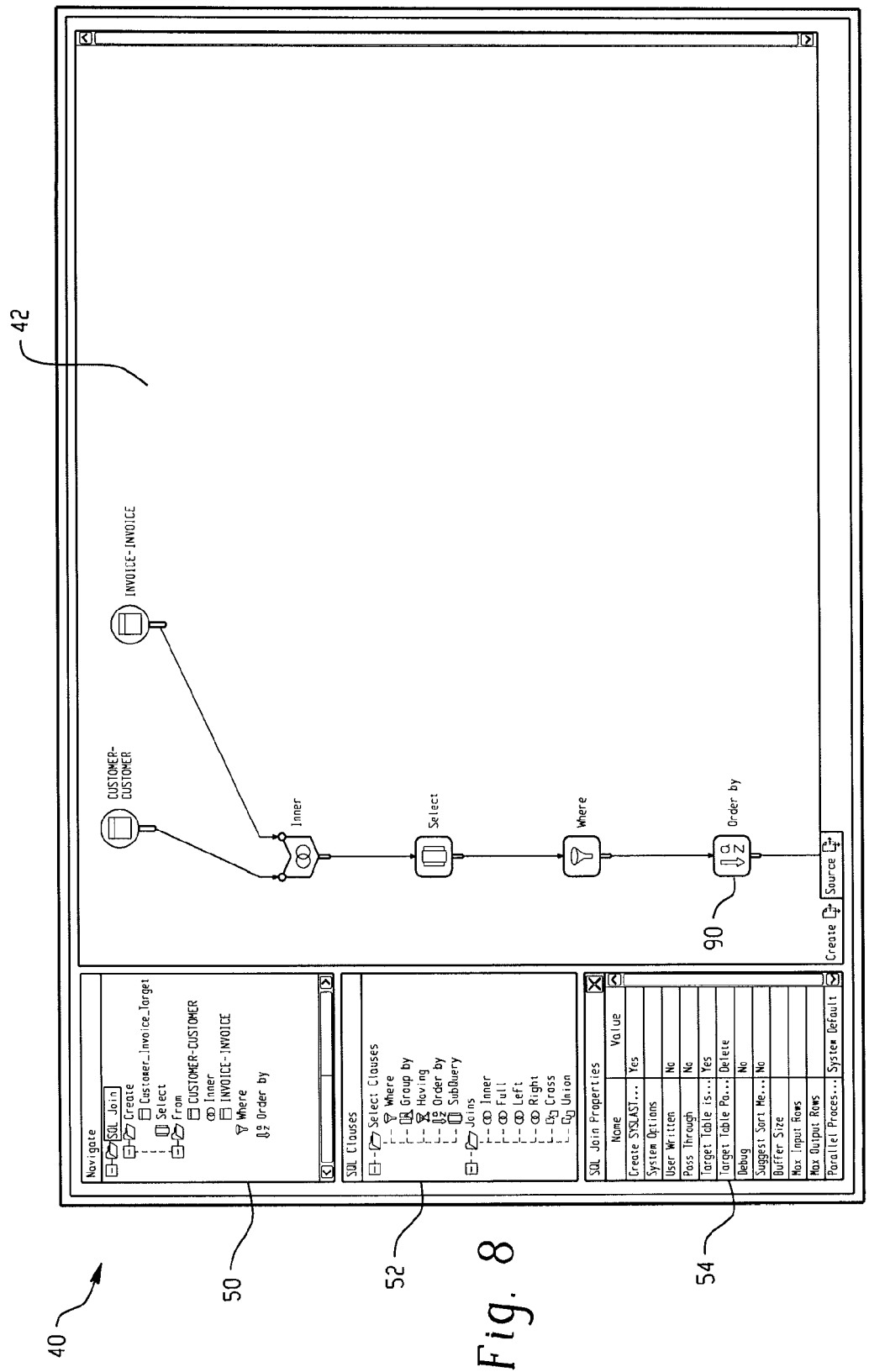
FIG. 8 depicts an example of a different SQL join operation defined using the graphical user interface of FIG. 2.

FIG. 8 depicts an example of a different SQL join operation defined using the graphical user interface of FIG. 2. As illustrated, other SQL operations in addition to the select and where operations may be added to the SQL expression using the interface 40. In this example, an order by operation has been added to the SQL expression by adding an order by graphical icon 90 in the create region 42. For example, the order by graphical icon 90 may be added by selecting the order by operation from the SQL clauses region 52 and dragging the icon into the create region 42. In one example, when an additional operation icon is dragged into the create region 42, the interface 40 may automatically insert the icon into an appropriate position in the SQL expression. In another example, double clicking on the "Order by" line in the SQL clauses region 52 may cause the order by graphical icon 90 to be automatically added to the join operation displayed in the create region 42.

Like other SQL operations displayed in the create region 42, the parameters of the order by operation may be defined by using the navigate region 50 to display one or more regions associated with the order by icon 90. For instance, selecting the "Order by" line in the navigate region 50 may cause regions associated with the order by icon 90 to be displayed, as illustrated in FIG. 9.

Figure 9:
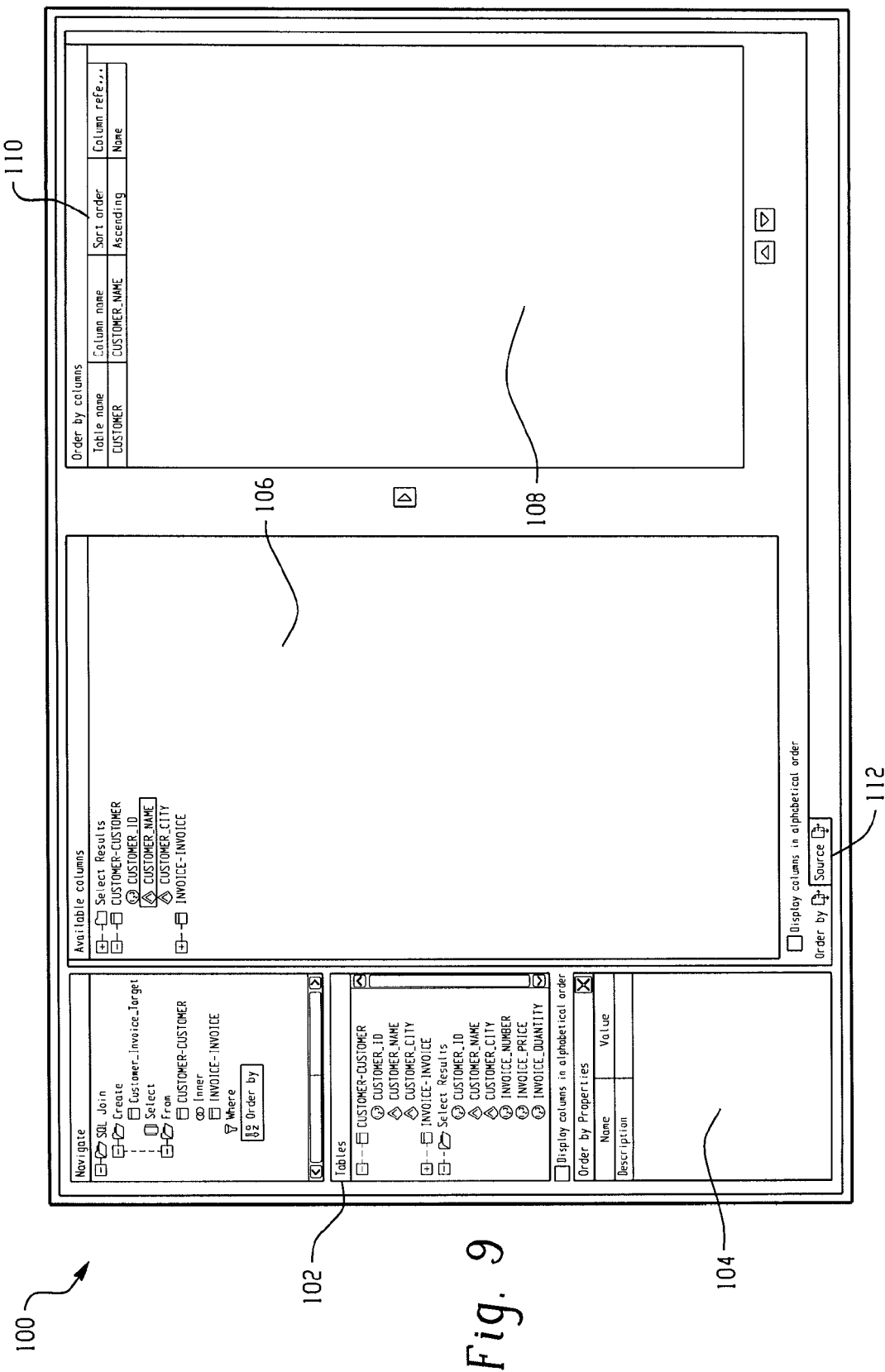
FIG. 9 depicts an example graphical user interface for defining the parameters of an SQL order by operation.

FIG. 9 depicts example interface regions 100, 102, 104 that may be displayed to define an SQL order by operation. The regions include an order by region 100, a table selection region 102 and an order by properties region 104. The table selection region 102 may be used to select tables to be included in the order by operation. The order by properties region 104 may be used to define one or more attributes of the order by operation. The order by region 100 may be used to select particular columns for the order by operation and to define the type of sort operation performed on the selected columns. Specifically, the illustrated order by region 100 includes an available columns portion 106 for selecting columns for the order by operation and an order by columns portion 108 for defining the type of sort operation to be performed. The order by columns portion 108 includes a sort order field 110 that is used to select the type of sort operation, for example using an associated pull-down menu.

In the illustrated example, the order by region 100 has been used to define an SQL order by operation to sort the members of the column CUSTOMER_NAME in ascending order. This causes the source code for the SQL order by operation to be automatically generated and displayed in a source code region 112. In this example, the source code region 112 is provided by selecting an associated graphical tab. In other examples, however, the source code region 112 may be displayed on the same screen as the order by region 100. Also, in other examples, the order by properties region 104 may include a user written field that enables the user to directly modify the SQL code generated using the order by region 100.

Figure 10:
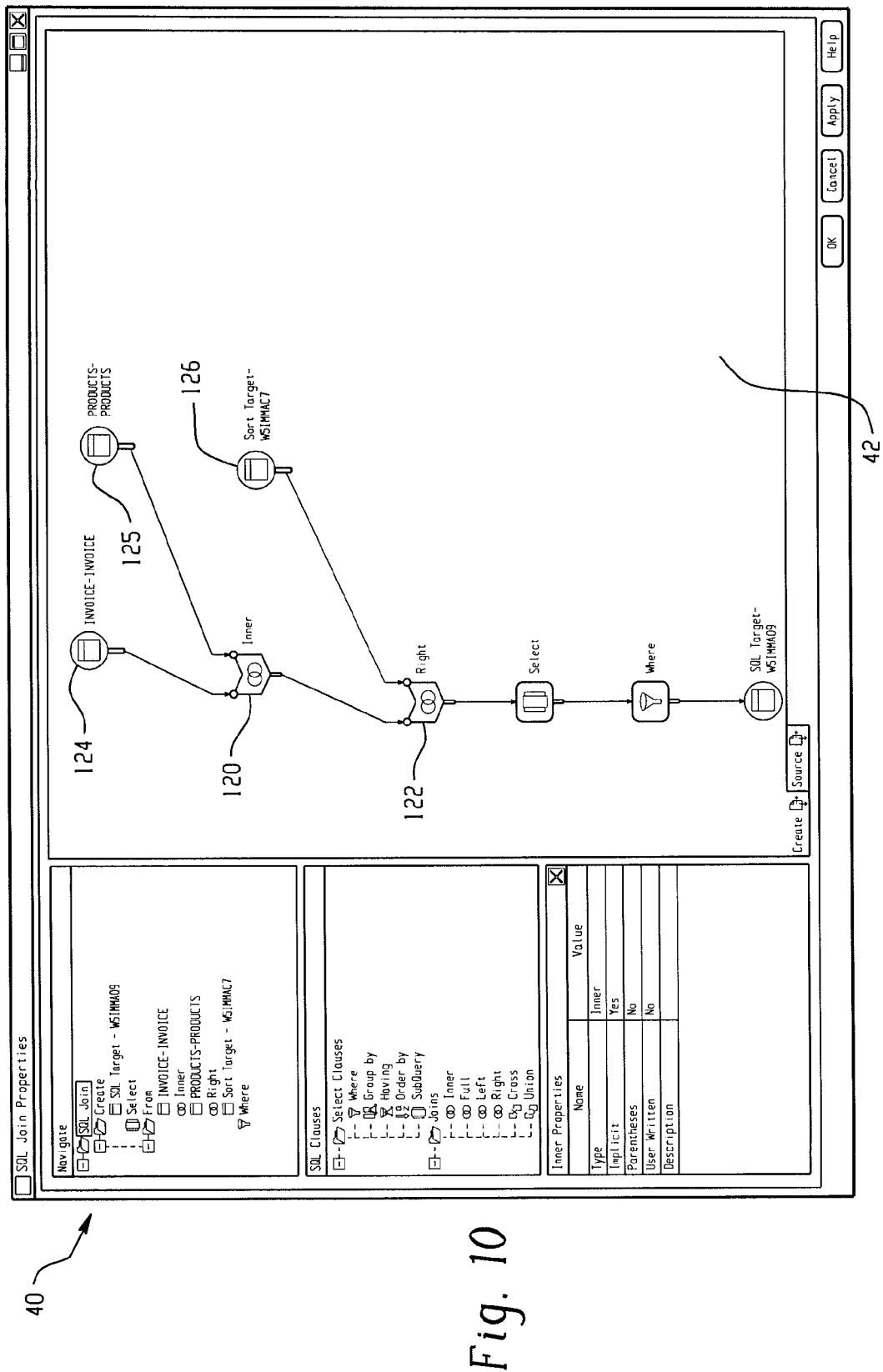
FIG. 10 depicts another example SQL join operation defined using the graphical user interface of FIG. 2.

FIG. 10 depicts another example SQL join operation defined using the graphical user interface 40 of FIG. 2. This example illustrates how the interface 40 may be used to define multiple join operations 120, 122. Specifically, in the illustrated example columns from three tables 124-126 are joined in two consecutive join operations 120, 122. In one example, the second join icon 122 may be automatically added to the SQL expression displayed in the create region 42 when the user inputs the third table 126. For instance, if a user drags a new table 126 into the create region 42 illustrated in FIG. 2, then the interface 40 may automatically insert the table 126 into the SQL expression by adding a second join icon 122 as illustrated in FIG. 10. The properties of the second join operation 122 may then be defined using one or more associated regions, as described above.

Figure 11:
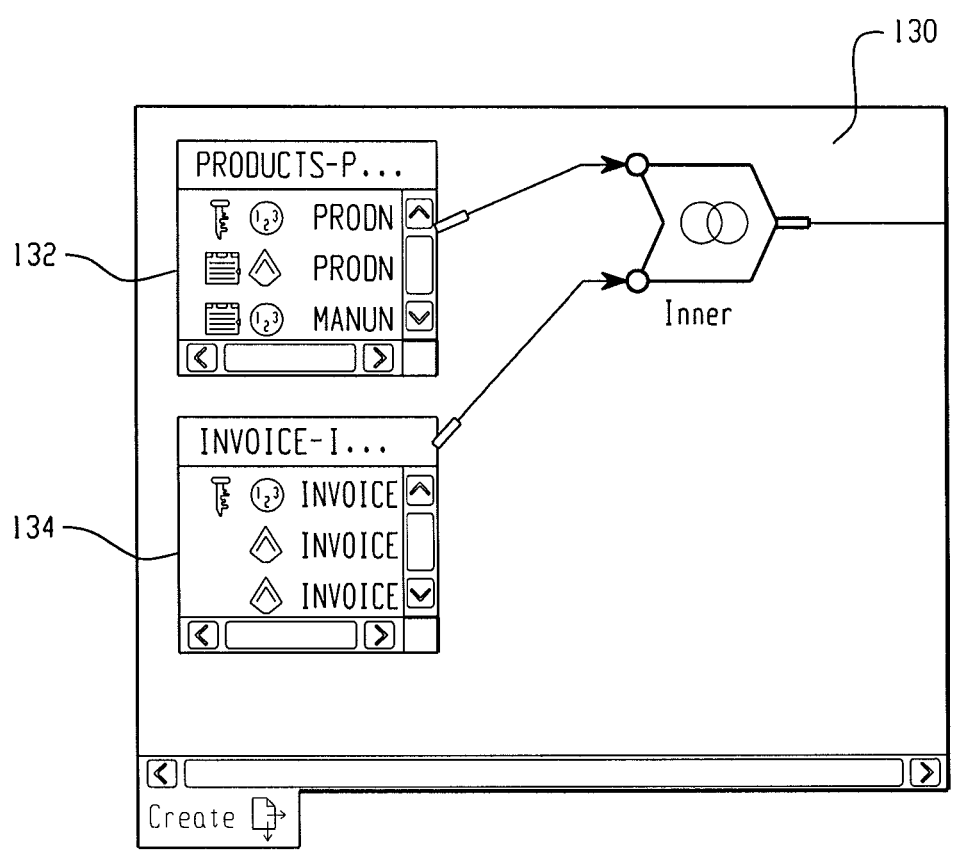
FIG. 11 depicts an example of expanded table icons.

FIG. 11 depicts another example of a create region 130 that displays an expanded view of the table icons 132, 134. The expanded table icons 132, 134 may, for example, be displayed by selecting an option associated with a non-expanded table icons 44, 45 as shown in FIG. 2. For instance, non-expanded table icons 44, 45 as shown in FIG. 2 may be displayed as a default setting, and the user may be able select an option to display the expanded table icons 132, 134 as shown in FIG. 11. In this example, the expanded table icons 132, 134 depict a list of the columns included in the table. The expanded table icons 132, 134 also include graphics to indicate whether the column includes a key or index. In one example, the columns displayed in the expanded table icons 132, 134 may be ordered by default to display the keys/indices first. In addition, a menu may be available to select from a variety of sorting options to define how the columns are displayed in the expanded table icons 132, 134. Example sorting options may include a sort by key type, a sort in ascending order, a sort in descending order, and/or other options.

Figure 12:
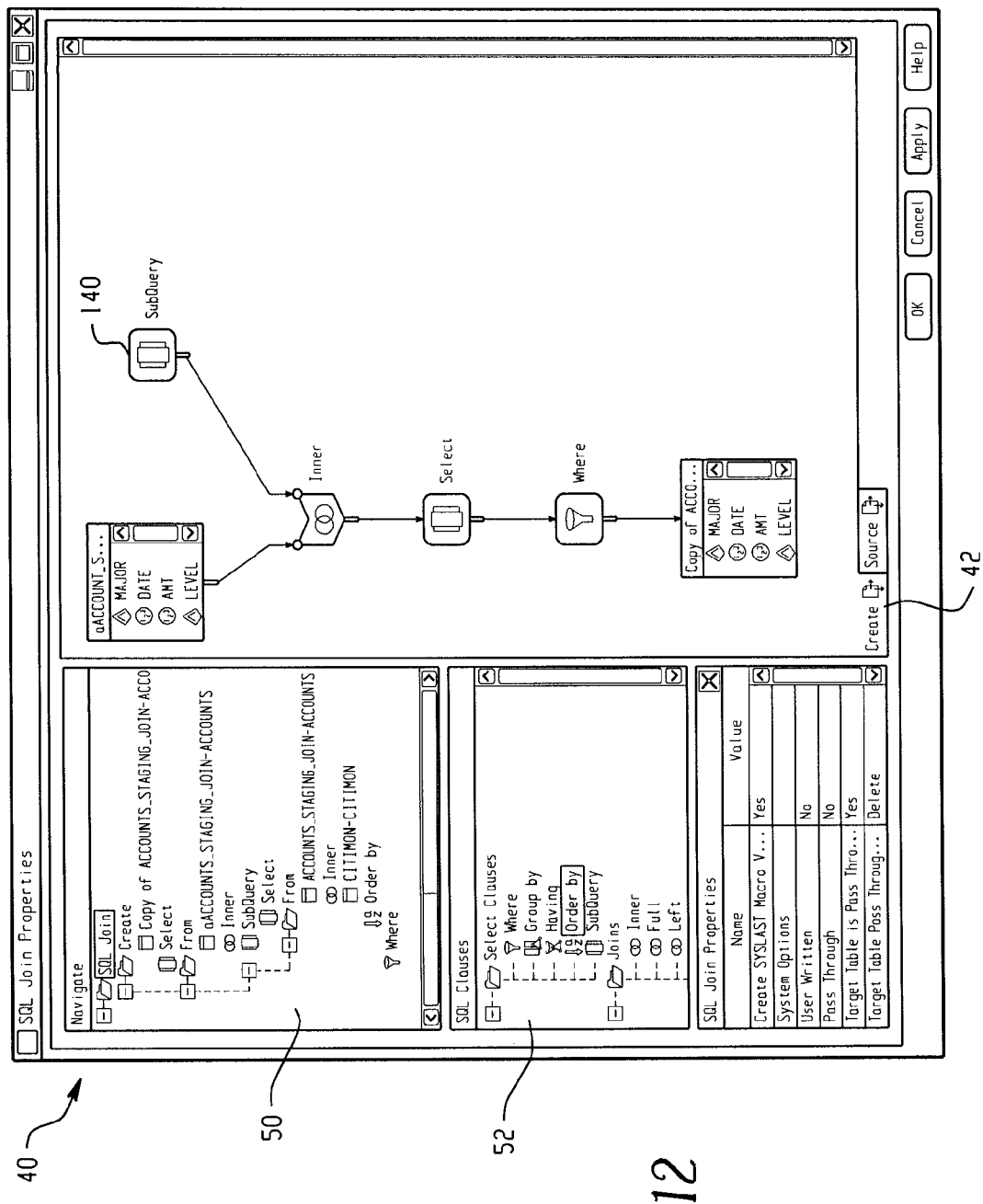
FIG. 12 depicts another example SQL join operation defined using the graphical user interface of FIG. 2.

FIG. 12 depicts another example SQL join operation defined using the graphical user interface 40 of FIG. 2. In this example, the join operation includes a subquery which is represented by a subquery icon 140 in the create region. The subquery icon 140 may, for example, be added to the SQL expression by selecting the subquery operation from the SQL clauses region 52 and dragging the associated icon 140 into the create region 42. The position of the subquery icon 140 within the SQL expression may be user defined by connecting the icon to the desired node in the display. Also, in one example, the interface 40 may automatically insert the subquery icon 140 at the most appropriate position in the SQL expression when the icon 140 is dropped into the create region 42.

Figure 13:
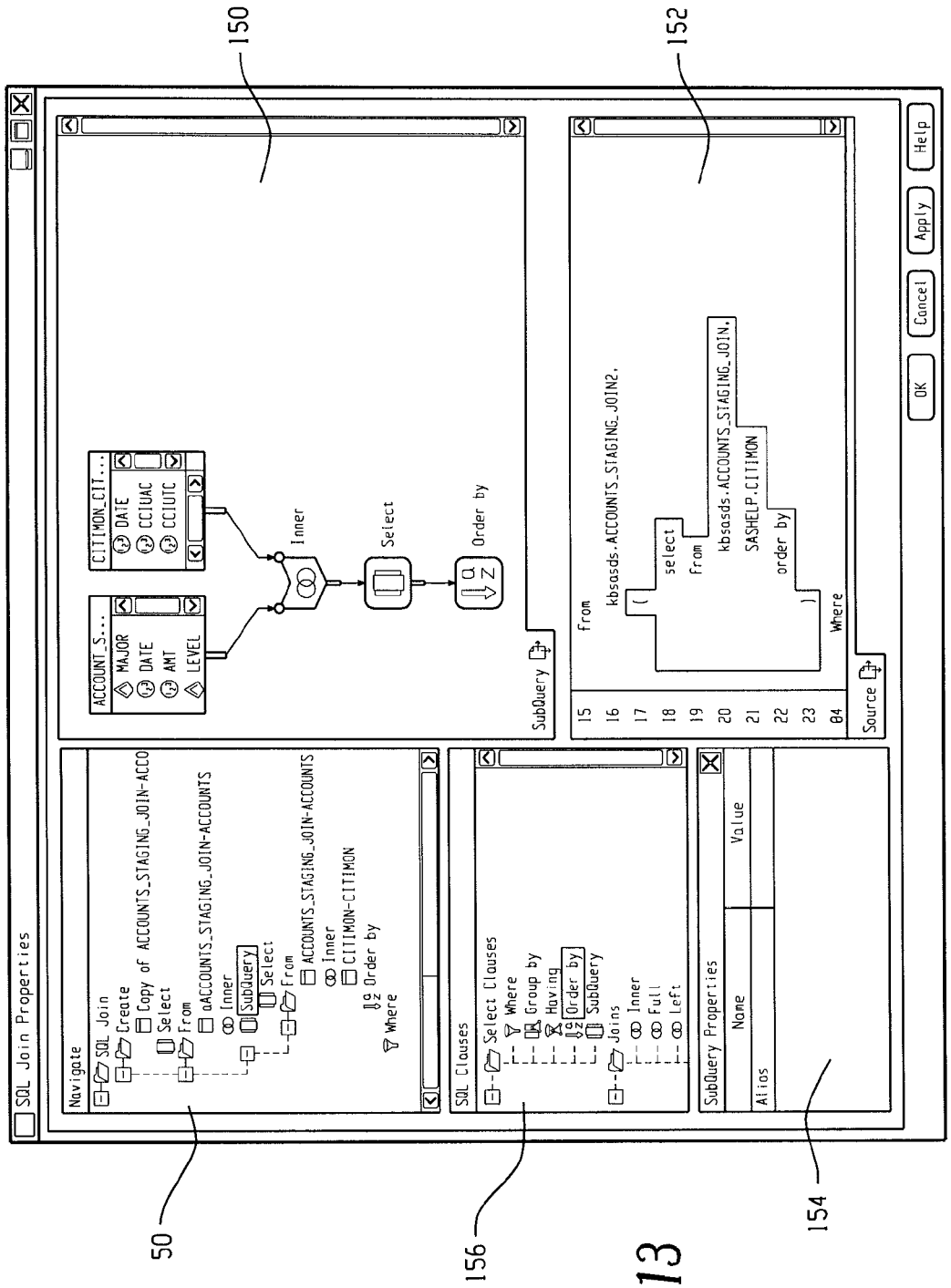
FIG. 13 depicts an example graphical user interface for defining the parameters of a subquery operation.

In order to define the properties of the subquery operation, a drill-down operation may be performed to cause one or more different regions 150, 152, 154, 156 associated with the subquery operation to be displayed, as illustrated in FIG. 13. The drill-down operation may, for example, be performed by selecting the "Subquery" line in the navigate region 50. In another example, a drill-down operation for the subquery icon 140 may be initiated by moving a cursor over the icon 140 and double-clicking a mouse button.

As illustrated, the navigate region 50 provides a hierarchical view of the SQL statement and its subqueries. The navigate region 50 provides the user with a convenient way to view the all of the hierarchical details of the SQL statement, including the details of each subquery. In addition, the hierarchical views displayed in the navigate region 50 may be expanded or collapsed, for example to show or hide the details of the subquery. In this way, the user can easily see the hierarchical relationship between all of the SQL clauses in the expression as well any hierarchical relationships within an SQL clause, such as nested subqueries.

With reference to FIG. 13, regions displayed in connection with the subquery operation include a subquery region 150, a source code region 152, a subquery properties region 154 and an SQL clauses region 156. The navigate region 50 is also displayed. The SQL clauses region 156 is used to build the subquery expression using graphical icons, similar to the create region 42 described above. SQL operations available for the subquery are listed in the SQL clauses region 156, and may be dragged into the subquery region 150 to build the subquery expression. The source code for the subquery expression is automatically generated and displayed in the source code region 152. In addition, one or more properties of the subquery may be defined using the subquery properties region 154. In one example, the subquery properties region 154 may include a user written field (not shown) that enables the user to directly modify the SQL code generated using the subquery region 150.

Figure 14:
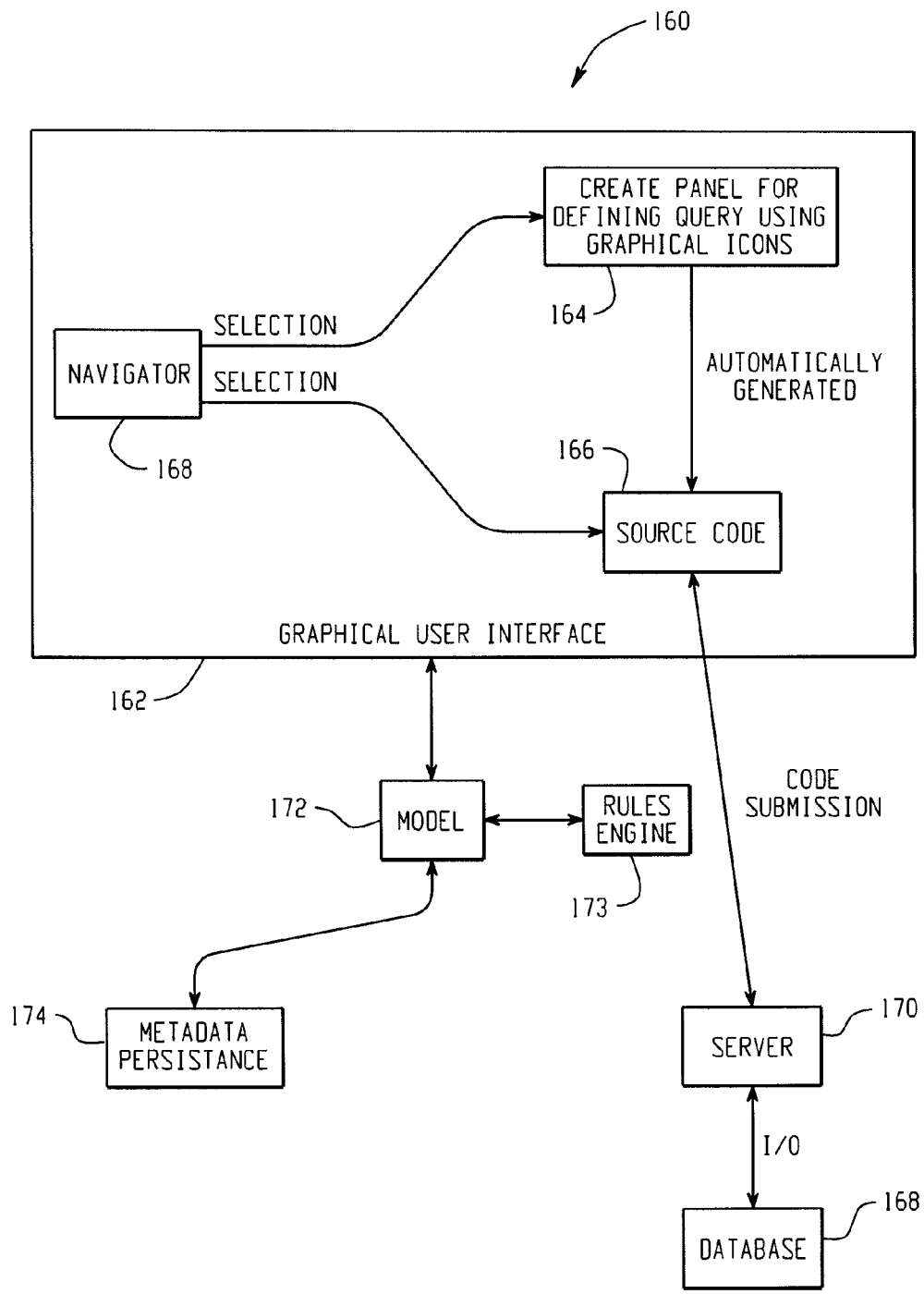
FIG. 14 is a block diagram depicting an example system for generating a database query using a graphical user interface.

FIG. 14 is a block diagram depicting an example system 160 for generating a database query using a graphical user interface 162. The graphical user interface 162 includes a create region 164 that is used to define the database query by interconnecting a plurality of graphical icons. The graphical icons include one or more clause-specific icons that identify database operations and one or more table icons that identify sets of data in the database 168. The graphical user interface 162 automatically generates source code 166 for the database query based on the interconnected graphical icons in the create region 164. The source code 166 may also be displayed in a region of the graphical user interface. The graphical user interface 162 also includes a navigator region 168 which may be used to provide a hierarchical view of the database operation and for navigating between the other regions 164, 166 to create and define the properties of the database operation.

The automatically generated source code 166 is submitted to a database server 170, which uses the code to query the database 168. FIG. 14 also illustrates that the query generated using the create region 164 may be constrained using a database expression model 172 having persistent metadata 174 and by a rules engine 173. The rules engine 173 may, for example, determine the best type of join operation (e.g., left, right, inner, outer) to use in an SQL expression based on the data being joined.

Figure 15:
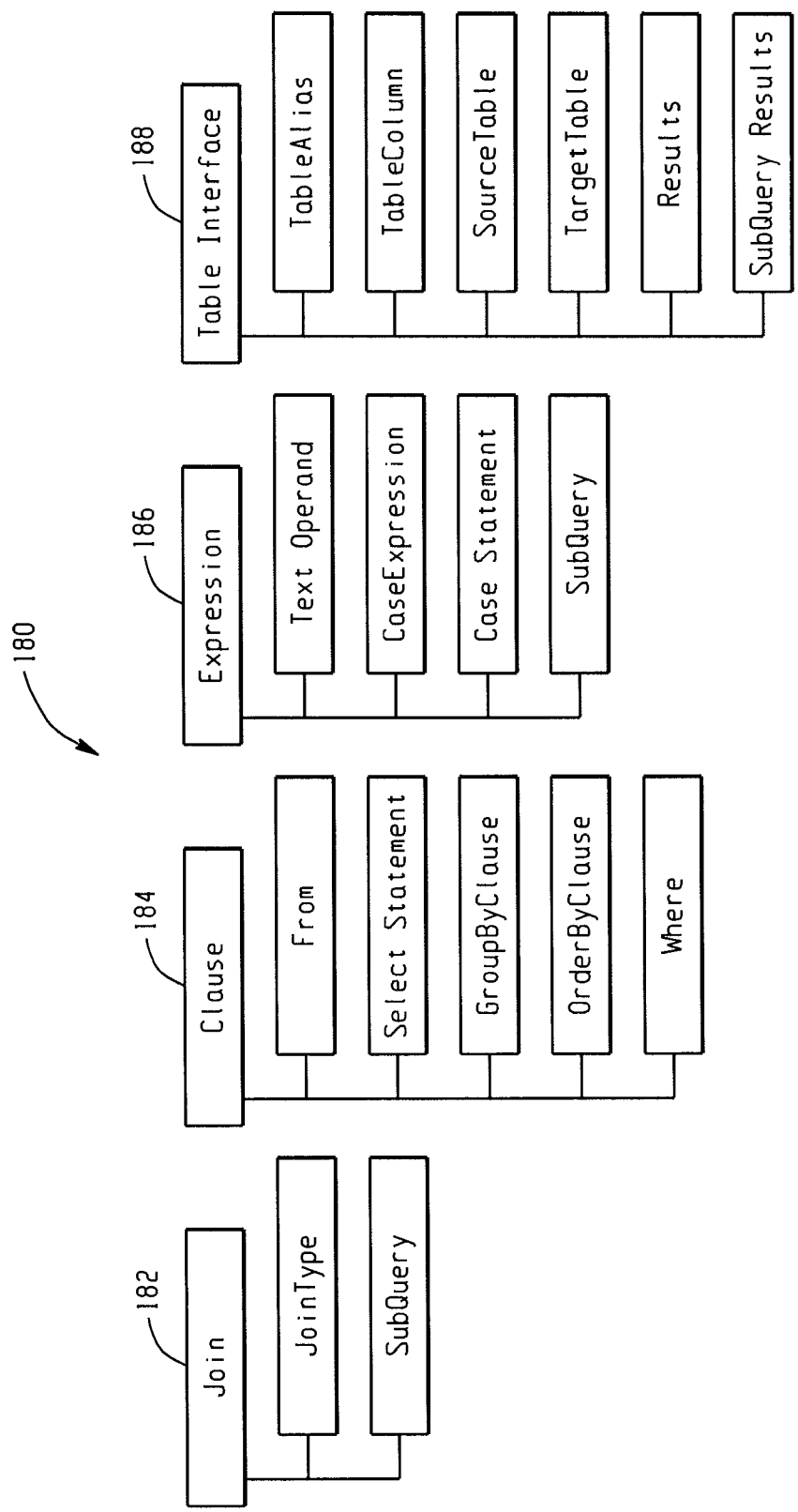
FIG. 15 illustrates an example model for defining an SQL join expression.

An example of a database expression model 180 that may be used by the graphical user interface 162 to create source code 166 for a database expression is depicted in FIG. 15. FIG. 15 illustrates an example model 180 for defining an SQL join expression. As illustrated the model 180 may define the types of join operations 182, the SQL clauses 184 that may be used to define the join operation, the SQL expressions 186 that may be used the join operation, and the table interfaces 188 that are available for retrieving and storing data.

Figure 16:
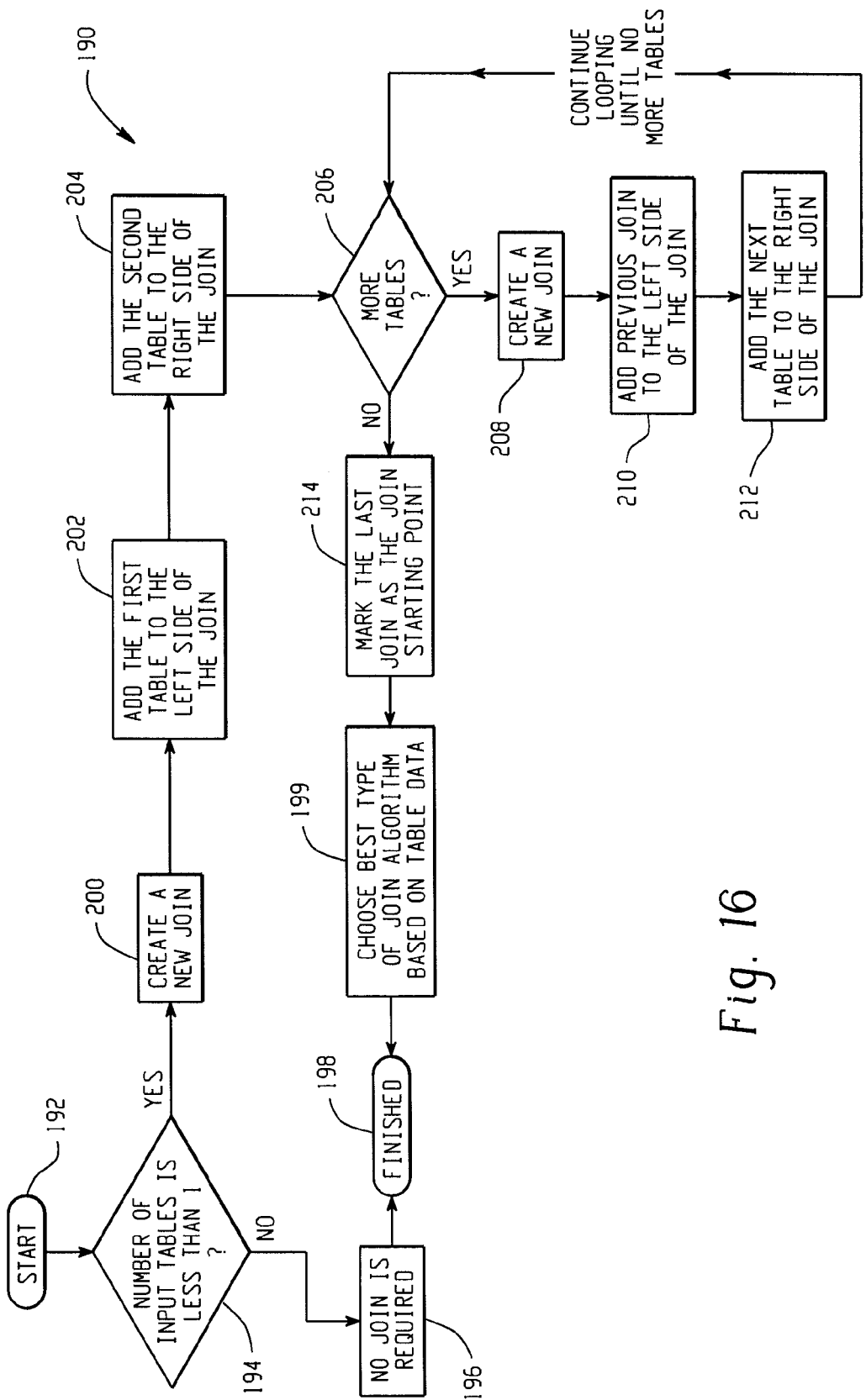
FIGS. 16-18 depict an example auto-join process that may be used to automatically define the parameters of a join operation.
Figure 17:
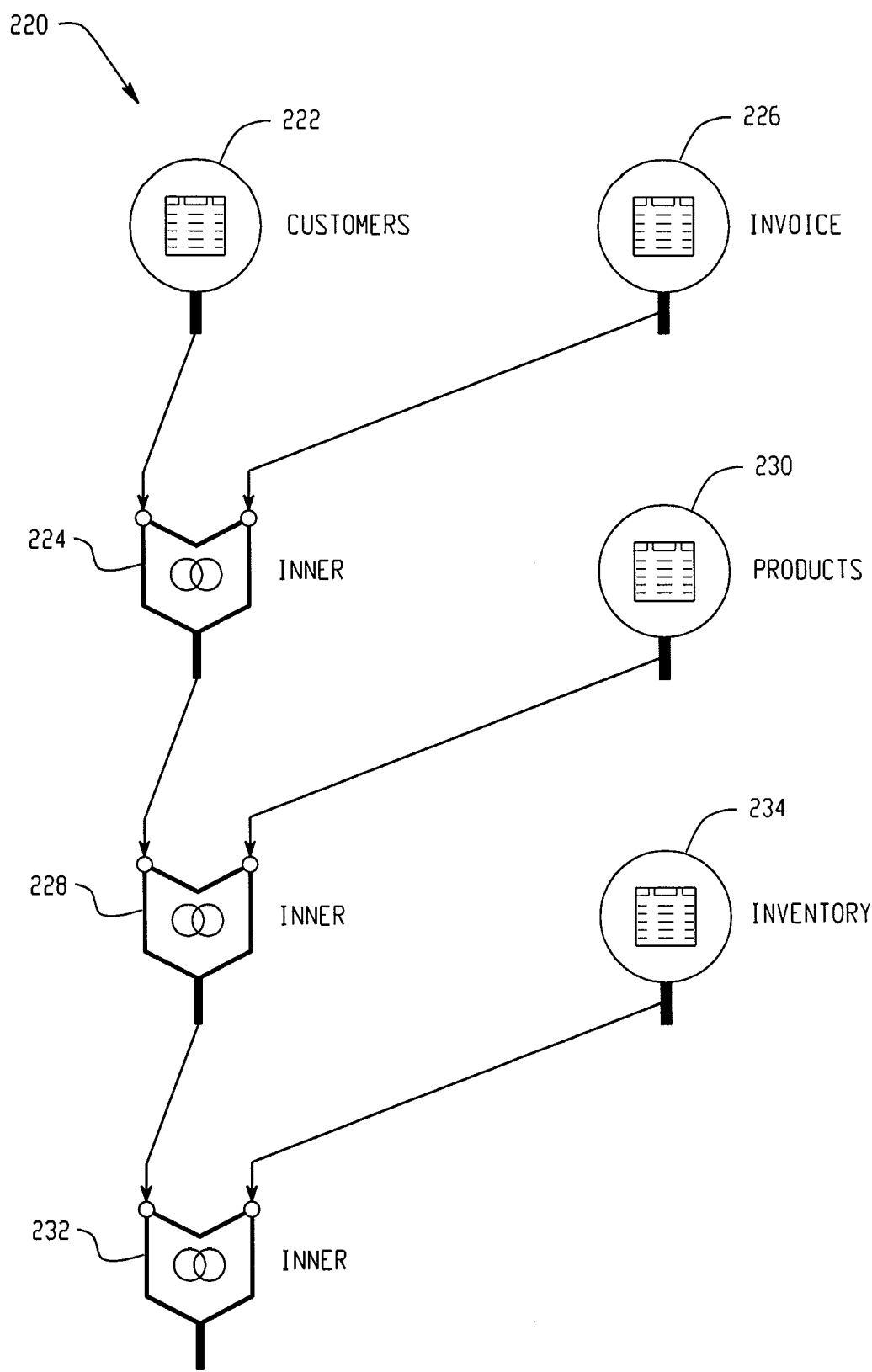
Figure 18A:
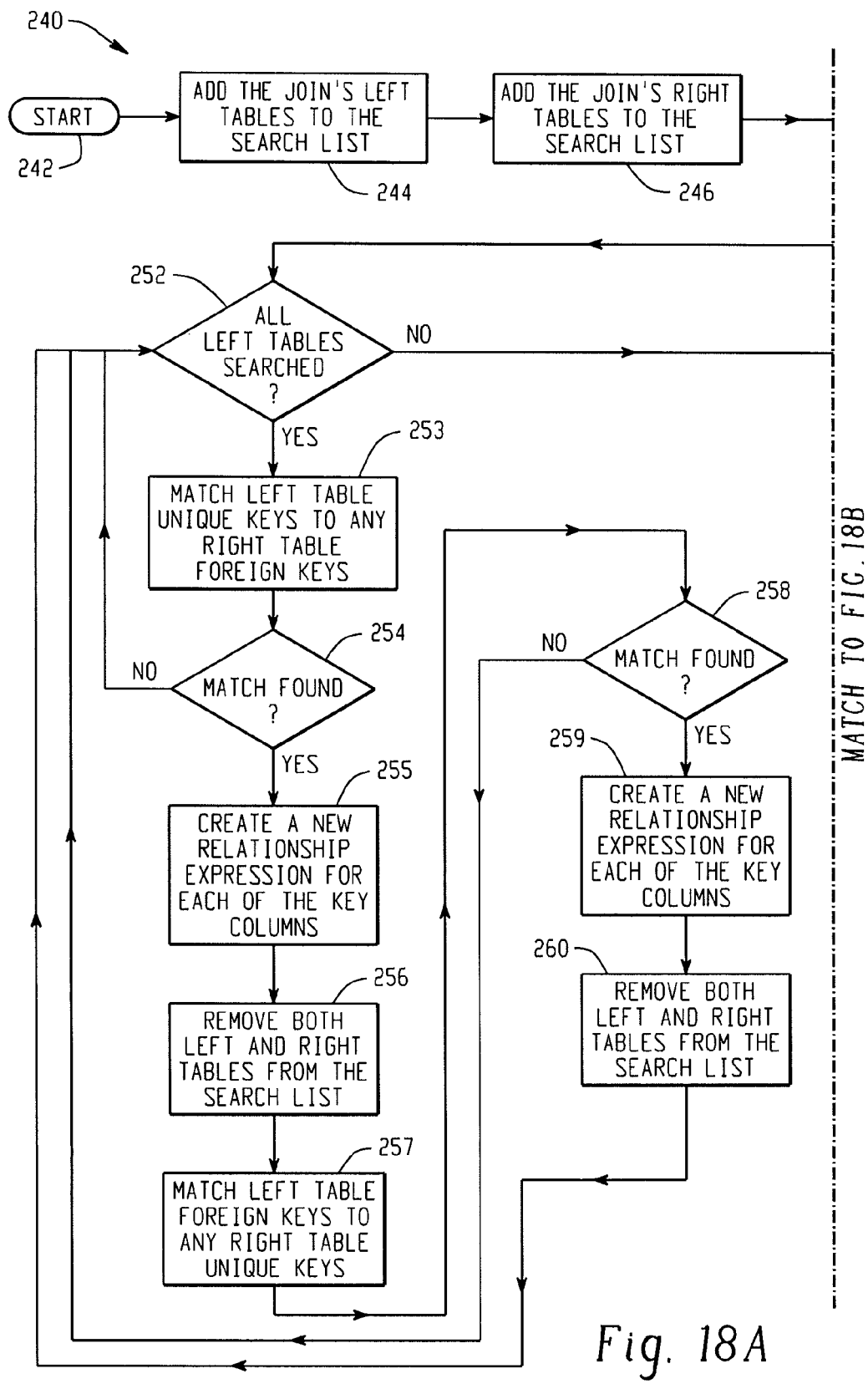
Figure 18B:
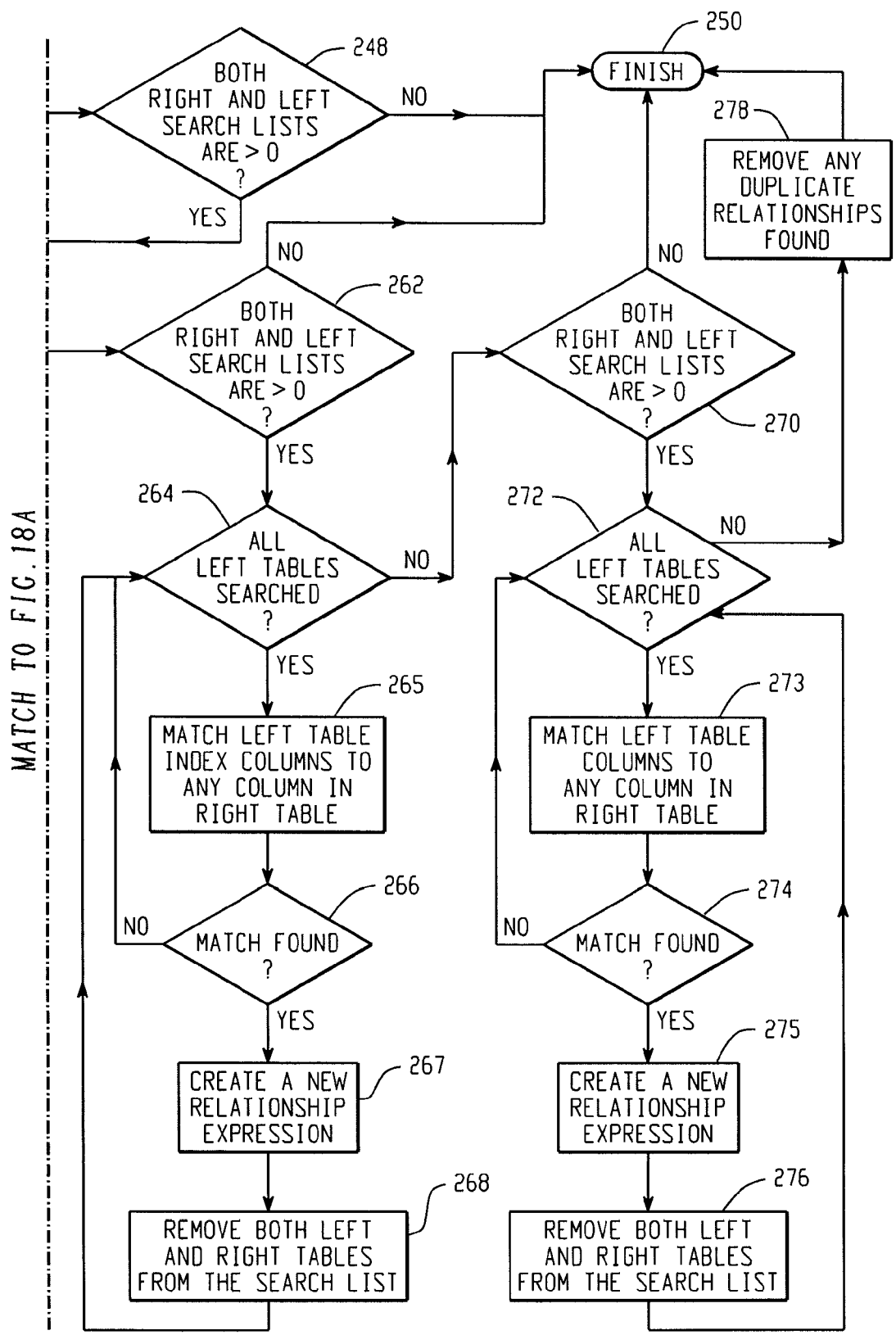

FIGS. 16-18 depict an example auto-join process that may be used to automatically define the parameters of a join operation. FIG. 16 is a flow diagram that depicts an example method 190 for determining a join order for an SQL join expression. FIG. 17 depicts an example of a join order that may be automatically generated by a graphical user interface using the method of claim 16. FIG. 18 is a flow diagram that depicts an example method for determining join relationships for an SQL join expression.

The auto-join process depicted in FIGS. 16-18 may, for example, be performed by the graphical user interface 40 described above with reference to FIGS. 2-13. For instance, if a user inputs two or more tables into the graphical user interface 40 (e.g., by dragging the tables into the create or subquery region), the graphical user interface 40 may use the auto-join process to automatically determine a suitable join relationship between the tables.

With reference first to FIG. 16, the example join order method 190 begins at step 192. At step 194, the method determines if more than one table has been input to the SQL operation. If not, then no join is required (step 196) and the method ends at step 198. Otherwise, if more than one table is input, then a new join operation is created at step 200. For example, a new join operation may be created by automatically adding an join icon to the create 42 or subquery region 150 described above. The join order is then determined based on the order in which the tables where input. Specifically, the first table that is input is added to the left side of the join in step 202, and the second table that is input is added to the right side of the join in step 204.

In step 206, the method determines if any additional tables have been input. If so, then another join is created at step 208, for example by automatically adding another join icon to the graphical user interface 40. The output of the previous join is then added to the left side of the join in step 210, and the additional table is added to the right side of the join in step 212. The method then returns to step 206 and repeats until all of the tables input to the SQL operation have been joined. When all of the tables have been added to the join expression, the last join is marked as the join starting point in step 214.

In step 215, the tables are then evaluated to determine the best type of join(s) for the SQL expression. For example, the best performing join type for the expression may be determined by performing different tests on the tables, such as frequency of data, size, etc. For instance, if an evaluation of the data identifies that a large table is being joined to a smaller table, then an index join or a hash join may be used. In another example, if the expression involves a heterogeneous join (i.e., joining tables on different databases) and it is determined that one of the tables is smaller, then the smaller table be moved to the database prior to joining the tables. After the join type is selected, the method ends at step 198.

To illustrate a join order created using the method illustrated in FIG. 16, consider an example in which the following tables are added in the following order: 1) "CUSTOMER" table is input first; 2) "INVOICE" table is input second; 3) "PRODUCTS" table is input third; and 4) INVENTORY table is input fourth. A graphical representation 220 of the join order that is created for this example is illustrated in FIG. 17. As shown, according to the method of FIG. 16, the "CUSTOMER" table 222 is added to the left side of the first join 224 and the "INVOICE" table 226 is added to the right side of the first join 224. The output of the first join 224 is added to the left side of a second join 228 and the "PRODUCTS" table 230 is added to the right side of the second join 228. Finally, the output of the second join 228 is added to the left side of a third join 230, and the "INVENTORY" table 232 is added to the right side of the third join.

With reference now to FIG. 18, the example join relationship determination method begins at step 242. Each of the tables on the left side of a join are added to a search list in step 244, and each of the tables on the right side of a join are added to the search list in step 246. The method then determines at step 248 whether there is at least one left side table and at least one right side table in the search list. If not, then the method ends at step 250. Otherwise, the method continues to step 252.

In steps 252-260, the method evaluates all of the unique and foreign keys in the left side tables to identify matches in the right side tables. In step 253, the method starts with the first left side table in the list and evaluates each of the left side table's unique keys to find any matching foreign keys in the right side table(s). If no matches are found (step 254), then the method returns to step 252 to evaluate the next left side table in the search list (if any). Otherwise, if a match is found then a new relationship expression is created in step 255 for each of the matching key columns, the associated left side and right side tables are removed from the search list in step 256, and the method proceeds to step 257.

At step 257, each of the left side table's foreign keys are evaluated to find any matching unique keys in the right side table(s). If no matches are found (step 258), then the method returns to step 252 to evaluate the next left side table in the search list (if any). Otherwise, if a match is found then a new relationship expression is created in step 259 for each of the key columns, the associated left side and right side tables are removed from the search list at step 260, and the method returns to step 252.

When the keys in all of the left side tables are evaluated (step 252), the method proceeds to step 262. At step 262, the method determines whether there is at least one left side table and at least one right side table remaining in the search list. If not, then the method ends at step 250. Otherwise, the method continues to step 264.

In steps 264-268, the method evaluates the table indices to find matches between the left side and right side tables. In step 265, the method starts with the first left side table in the search list and determines if there are any index columns in the table that match an index column in a right side table(s). If no match is found (step 266), then the method returns to step 264 to evaluate the next left side table in the search list (if any). Otherwise, if matching index columns are identified, then a new relationship expression is created at step 267, the associated right side and left side tables are removed from the search list in step 268, and the method returns to step 264.

When the index columns in all of the left side tables have been evaluated (step 252), the method proceeds to step 270. At step 270, the method determines whether there is at least one left side table and at least one right side table remaining in the search list. If not, then the method ends at step 250. Otherwise, the method continues to step 272.

In steps 272-276, the method evaluates the table columns to identify matches. In step 273, the method starts with the first left side table remaining in the list and determines if any table columns match a table column in a right side table. A column match may, for example, be identified if the name and type of the columns match. If no match is found (step 274), then the method returns to step 272 to evaluate the next left side table in the search list (if any). Otherwise, if a matching column is identified, then a new relationship expression is created in step 275, the associated right and left side tables are removed from the search list in step 276, and the method returns to step 272.

When the columns in all of the left side tables have been evaluated (step 272), the method removes any duplicate relationship expressions at step 278. The method then ends at step 250.

To illustrate a join relationship using the method of FIG. 18, consider the example join shown in FIG. 17 with the following columns included in the tables:

"CUSTOMER" table:
    Primary key - "CUSTOMER_ID"
"INVOICE" table:
    Primary key - "INVOICE_NUMBER"
    Foreign key - "CUSTOMER_ID"
    Foreign key - "PRODUCT_NUMBER"
"PRODUCTS" table:
    Primary key - "PRODUCT_NUMBER"
"INVENTORY" table
    Index - "PRODUCT_NUMBER"

Applying the method of FIG. 18 to the above example, the left side table "CUSTOMER" from the first join 224 is first evaluated to identify the key relationship on "CUSTOMER_ID" with the right side table "INVOICE." A relationship expression is created and both of these tables are removed from the matching process. The left side table in the search list for the second join 228 includes the join of both the "CUSTOMER" AND "INVOICE" tables. From this left side table, the key relationship between the "INVOICE" and "PRODUCTS" tables is identified on the column "PRODUCT-NUMBER," a relationship expression is created and both tables are removed. The left side table in the search list for the third join 230 includes the join of the "CUSTOMER", "INVOICE" and "PRODUCTS" tables. No key relationships can be identified for this left side table. Therefore, the indices are searched to identify the match between the "PRODUCTS" and "INVENTORY" tables on the column "PRODUCT_NUMBER," and a third relationship expression is created. Both tables are then removed from the search list and the process ends. The SQL join operation in this example would thus be initialized with the following expression:

```
CUSTOMERS.CUSTOMER_ID = INVOICE.CUSTOMER_ID and
INVOICE.PRODUCT_NUMBER =
PRODUCTS.PRODUCT_NUMBER and
PRODUCTS.PRODUCT_NUMBER =
INVENTORY.PRODUCT_NUMBER
```

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A method for generating a database query, comprising:
displaying, using one or more data processors, one or more selectable icons on an interface, wherein the one or more selectable icons correspond to tables and database operations;
receiving a selection of an icon representing a database operation, wherein the selection of the icon causes a drill-down operation to be performed on the database operation, wherein the drill-down operation causes the representation of the selected icon to be replaced with a new representation of the selected icon in a new interface, and wherein the new representation of the selected icon includes one or more selectable sub-operation icons corresponding to sub-operations of the database operation;
in response to receiving the selection of the icon, generating, using one or more data processors, a new interface corresponding to the drill-down operation, wherein the new interface includes a creation region, and wherein the creation region includes the one or more selectable sub-operation icons corresponding to sub-operations of the database operation;
receiving a selection in the creation region corresponding to a sub-operation icon, wherein selecting the sub-operation icon causes a further drill-down operation to be performed on the corresponding sub-operation;
generating an additional interface corresponding to the further drill-down operation, wherein the additional interface is configured to receive definition data for the corresponding sub-operation;
receiving the definition data for the corresponding sub-operation; and
transmitting a command to execute the database operation, wherein the database operation is executed using the definition data.

2. The method of claim 1, further comprising:
automatically generating source code based on the definition data; and
displaying the source code in a source code region of a graphical interface.

3. The method of claim 1, wherein the database query is an SQL query, wherein the database operation is an SQL join operation, and wherein the sub-operation icon is associated with an SQL clause.

4. The method of claim 1, wherein the definition data identifies two or more columns of a database.

5. The method of claim 1, wherein the additional interface is configured to receive definition data corresponding to an SQL where statement.

6. The method of claim 1, wherein the additional interface is configured to receive definition data corresponding to an SQL join statement.

7. The method of claim 1, wherein the drill-down operation is initiated by a mouse button operation.

8. The method of claim 1, wherein the further drill-down operation automatically identifies two tables for a join sub-operation.

9. The method of claim 8, wherein the further drill-down operation automatically matches one or more keys of the two tables to define the join sub-operation.

10. The method of claim 8, wherein a type of the join sub-operation is automatically selected.

11. The method of claim 10, wherein the type is automatically selected based on one or more properties of the two tables.

12. A computer-implemented system for generating a database query, comprising:
one or more computers;
computer software containing instructions configured to cause the one or more computers to perform operations including:
displaying one or more selectable icons on an interface, wherein the one or more selectable icons correspond to tables and database operations;
receiving a selection of an icon representing a database operation, wherein the selection of the icon causes a drill-down operation to be performed on the database operation, wherein the drill-down operation causes the representation of the selected icon to be replaced with a new representation of the selected icon in a new interface, and wherein the new representation of the selected icon includes one or more selectable sub-operation icons corresponding to sub-operations of the database operation;
in response to receiving the selection of the icon, generating a new interface corresponding to the drill-down operation, wherein the new interface includes a creation region, and wherein the creation region includes the one or more selectable sub-operation icons corresponding to sub-operations of the database operation;
receiving a selection in the creation region corresponding to a sub-operation icon, wherein selecting the sub-operation icon causes a further drill-down operation to be performed on the corresponding sub-operation;
generating an additional interface corresponding to the further drill-down operation, wherein the additional interface is configured to receive definition data for the corresponding sub-operation;
receiving the definition data for the corresponding sub-operation; and
transmitting a command to execute the database operation, wherein the database operation is executed using the definition data.

13. The system of claim 12, wherein the operations further include:
displaying a graphical user interface that includes a source code region configured to display source code that is automatically generated based on receiving the definition data.

14. The system of claim 12, wherein the database query is an SQL query, wherein the database operation is an SQL join operation, and wherein the sub-operation icons are associated with a plurality SQL clauses.

15. The system of claim 12, wherein the definition data identifies two or more columns of a database.

16. The system of claim 12, wherein the additional interface is configured to receive definition data corresponding to an SQL where statement.

17. The system of claim 12, wherein the additional interface is configured to receive definition data corresponding to an SQL join statement.

18. The system of claim 12, wherein the drill-down operation is initiated by a mouse button operation.

19. The system of claim 12, wherein the further drill-down operation automatically identifies two tables for a join sub-operation.

20. The system of claim 19, wherein the further drill-down operation automatically matches one or more keys of the two tables to define the join sub-operation.

21. The system of claim 20, wherein a type of the join sub-operation is automatically selected.

22. The system of claim 21, wherein the type is automatically selected based on one or more properties of the two tables.

23. A computer program product for generating a database query, tangibly embodied in a machine-readable non-transitory storage medium, including instructions configured to cause a data processing system to:
display one or more selectable icons on an interface, wherein the one or more selectable icons correspond to tables and database operations;
receive a selection of an icon representing a database operation, wherein the selection of the icon causes a drill-down operation to be performed on the database operation, wherein the drill-down operation causes the representation of the selected icon to be replaced with a new representation of the selected icon in a new interface, and wherein the new representation of the selected icon includes one or more selectable sub-operation icons corresponding to sub-operations of the database operation;
in response to receiving the selection of the icon, generate a new interface corresponding to the drill-down operation, wherein the new interface includes a creation region, and wherein the creation region includes the one or more selectable sub-operation icons corresponding to sub-operations of the database operation;
receive a selection in the creation region corresponding to a sub-operation icon, wherein selecting the sub-operation icon causes a further drill-down operation to be performed on the corresponding sub-operation;
generate an additional interface corresponding to the further drill-down operation, wherein the additional interface is configured to receive definition data for the corresponding sub-operation;
receive the definition data for the corresponding sub-operation; and
transmit a command to execute the database operation, wherein the database operation is executed using the definition data.

* * * * *